United States Patent
Hu et al.

(10) Patent No.: US 10,712,633 B2
(45) Date of Patent: Jul. 14, 2020

(54) OPTICAL SYSTEM

(71) Applicant: TDK TAIWAN CORP., Yangmei Taoyuan (TW)

(72) Inventors: Chao-Chang Hu, Yangmei Taoyuan (TW); Chih-Wei Weng, Yangmei Taoyuan (TW); Cheng-Kai Yu, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 78 days.

(21) Appl. No.: 15/977,176

(22) Filed: May 11, 2018

(65) Prior Publication Data

US 2018/0329276 A1    Nov. 15, 2018

Related U.S. Application Data

(60) Provisional application No. 62/505,420, filed on May 12, 2017.

(30) Foreign Application Priority Data

May 7, 2018    (CN) .......................... 2018 1 0428101

(51) Int. Cl.
*G02B 26/08*    (2006.01)
*G03B 5/00*    (2006.01)
*G03B 17/17*    (2006.01)

(52) U.S. Cl.
CPC ............... *G03B 5/00* (2013.01); *G03B 17/17* (2013.01); *G03B 2205/0007* (2013.01); *G03B 2205/0023* (2013.01); *G03B 2205/0038* (2013.01)

(58) Field of Classification Search
CPC .............. G03B 5/00; G03B 2205/0023; G03B 2205/0038; G03B 17/17; G03B 2205/0007
USPC ...................................................... 359/226.1
See application file for complete search history.

(56) References Cited

U.S. PATENT DOCUMENTS

| 4,733,065 A * | 3/1988 | Hoshi | G11B 7/1353 |
| | | | 250/201.5 |
| 2015/0083692 A1* | 3/2015 | Bruck | B23K 26/34 |
| | | | 219/76.14 |
| 2016/0306168 A1* | 10/2016 | Singh | G02B 7/02 |

* cited by examiner

*Primary Examiner* — Euncha P Cherry
(74) *Attorney, Agent, or Firm* — Muncy, Geissler, Olds & Lowe, P.C.

(57) ABSTRACT

An optical system is provided and includes a light-sensing element, at least one optical lens, a reflecting unit and a first driving assembly. The reflecting unit includes a reflecting surface, configured to receive an incident light and to reflect a reflecting light. The reflecting light travels through the optical lens into the light-sensing element. The first driving assembly is configured to control the reflecting unit to move along a first axis direction, so as to adjust a focus position of the reflecting light on the light-sensing element.

10 Claims, 14 Drawing Sheets

OPTICAL SYSTEM

CROSS REFERENCE TO RELATED APPLICATIONS

This application claims the benefit of U.S. Provisional Application No. 62/505,420, filed May 12, 2017, and China Patent Application No. 201810428101.7, filed May 7, 2018, the entirety of which are incorporated by reference herein.

BACKGROUND OF THE DISCLOSURE

Field of the Disclosure

The present disclosure relates to an optical system, and more particularly to an optical system that has a function of optical image stabilization.

Description of the Related Art

As technology has progressed, many kinds of electronic devices such as tablet computers and smartphones have begun to include the functionality of digital photography or video recording. A user can take photos having different effects through the configuration of a lens system with a long focal length. Electronic devices with the lens system with a long focal length have gradually become popular.

However, when a lens with a long focal length is disposed in the aforementioned electronic device, the thickness of the electronic device may increase, which is disadvantageous in the effort to miniaturize the electronic device. Therefore, a reflecting member is generally disposed inside the lens system, and incident light is directed to a light-sensing element in the lens system through reflection. Based on the configuration, the thickness of the electronic device can be reduced. However, when the electronic device is shaken, the position of the light-sensing element where the incident light reaches may shift to a position that is different from the predetermined position, resulting in unclear imaging by the lens system.

Therefore, how to design the structure of a lens system to prevent the problem of an unclear image resulting from the shaking of the lens system is a topic nowadays that needs to be discussed and solved.

BRIEF SUMMARY OF THE DISCLOSURE

Accordingly, one objective of the present disclosure is to provide an optical system having a plurality of driving assemblies, so as to solve the above problems.

According to some embodiments of the disclosure, an optical system includes a light-sensing element, at least one optical lens, a reflecting unit and a first driving assembly. The reflecting unit includes a reflecting surface, configured to receive an incident light and to reflect a reflecting light. The reflecting light is projected into the light-sensing element through the optical lens. The first driving assembly is configured to control the reflecting unit to move along a first axis direction, so as to adjust a focus position of the reflecting light on the light-sensing element.

In some embodiments, the reflecting unit and the optical lens are arranged along a first direction, the incident light is emitted to the reflecting unit along a second direction, and a third direction is perpendicular to the first direction and the second direction, wherein the first axis direction is not parallel to the third direction. In some embodiments, the first direction is substantially perpendicular to a light-sensing surface of the light-sensing element.

In some embodiments, the reflecting surface includes an arc structure. In some embodiments, a center of the arc structure corresponds to a center of the incident light. In some embodiments, the reflecting surface includes a radius, and the radius substantially ranges from 100 to 1000 mm. In some embodiments, the reflecting surface further includes a flat surface, and the arc structure surrounds the flat surface. In some embodiments, the arc structure is a convex structure or a concave structure.

In some embodiments, the optical system further includes a second driving assembly, configured to drive the reflecting unit to rotate around a second axis. In some embodiments, the optical system further includes a third driving assembly, configured to drive the reflecting unit to rotate around a third axis.

The present disclosure provides an optical system with a long focal length that is installed in an electronic device for capturing images. The optical system can have a lens module, a reflecting module, a light-sensing element, and a plurality of driving assemblies. The reflecting module includes a reflecting unit. The reflecting unit can reflect an external light to the lens module and then to the light-sensing element, so as to generate a digital image. It should be noted that when the optical system is shaken, the plurality of driving assemblies can control the reflecting unit to move along a first axis direction, rotate around a second axis and/or rotate around a third axis, to adjust the focus position of the reflecting light on the light-sensing element, so as to achieve the purpose of optical image stabilization. Therefore, the image quality of the light-sensing element can also be improved.

In some embodiments, the reflecting surface of the reflecting unit is a flat surface, and the driving assemblies can only control the reflecting unit to move along the first axis direction, so as to achieve the purpose of compensating for the focus position. In addition, in some embodiments, the reflecting surface of the reflecting unit can further include an arc structure. Based on the design of the arc structure, the focus position of the light which is reflected by the periphery of the reflecting surface onto the light-sensing element can be more accurate.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
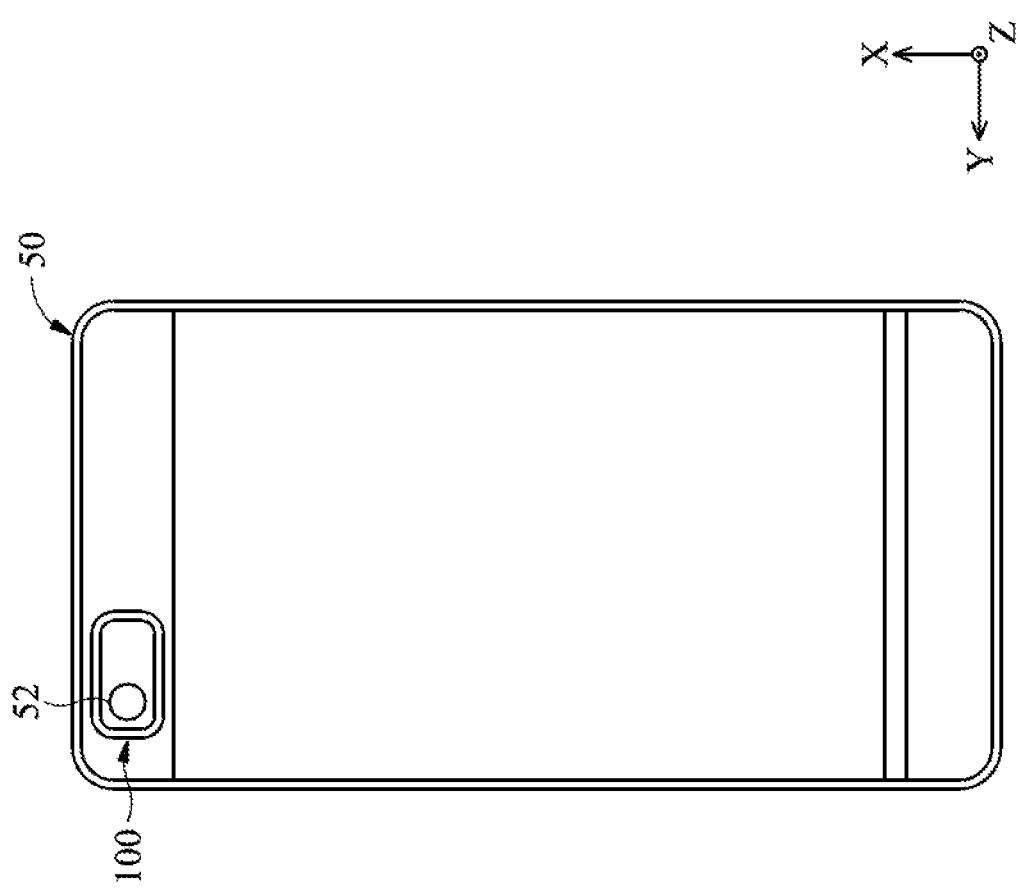
FIG. 1 shows a schematic diagram of an optical system installed on a portable electronic device according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which shows a schematic diagram of an optical system 100 installed on a portable electronic device 50 according to an embodiment of the present disclosure. The portable electronic device 50 can be any kind of portable electronic devices or handheld device, such as a personal digital assistant (PDA), a smartphone, a tablet, a mobile phone, a mobile Internet device (MID), a notebook computer, a car computer, a digital camera, a digital media player, a gaming device or any other type of mobile computing device. However, it will be understood by a person skilled in the art that the present disclosure is not limited to those devices. In this embodiment, the optical system 100 can be a camera system with a long focal length and can provide a better image effect of a photo for a user. Light is emitted into the optical system 100 through an opening 52, so as to generate one or several digital images.

Figure 2:
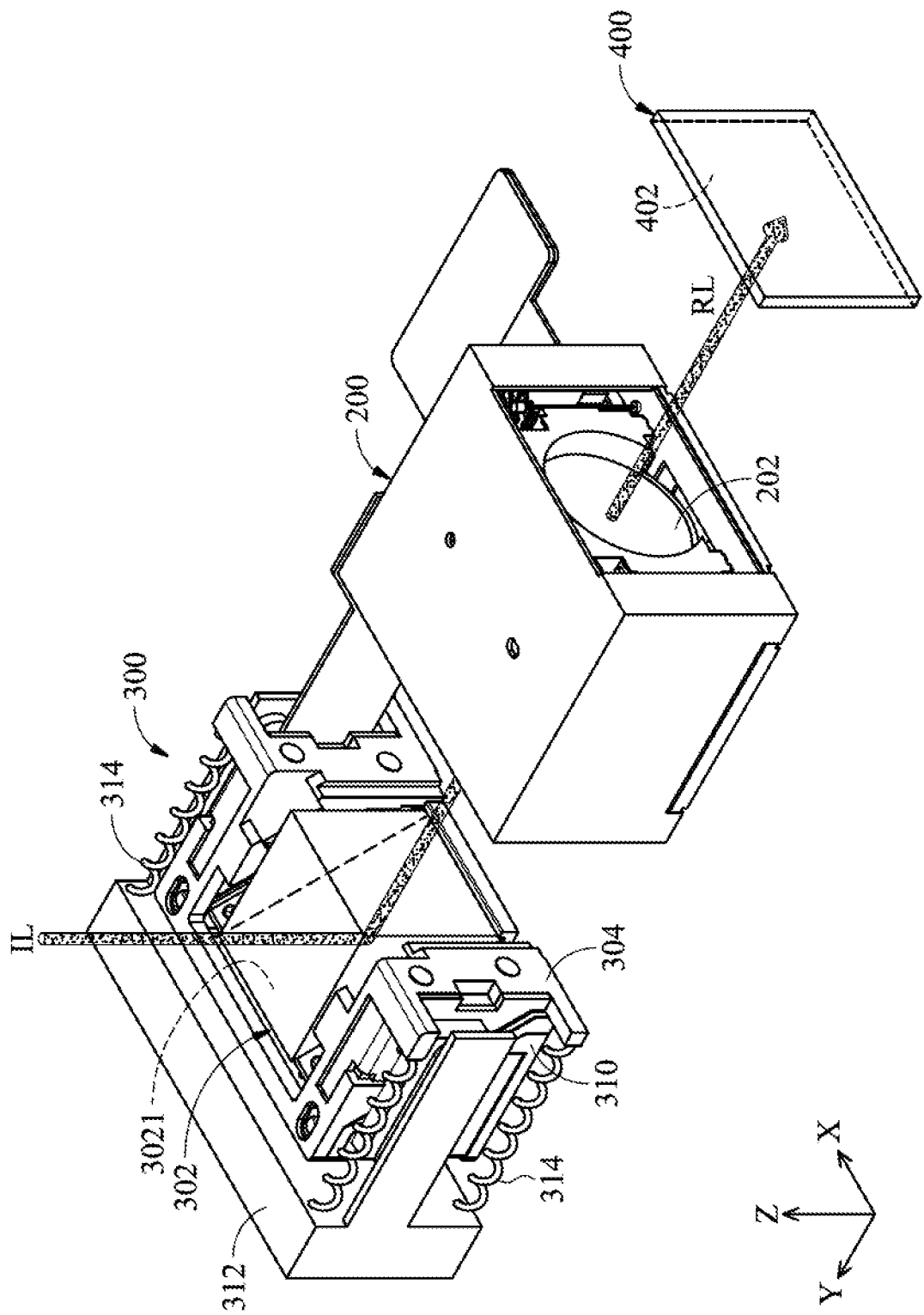
FIG. 2 shows a schematic diagram of the optical system according to the embodiment of the present disclosure.

Please refer to FIG. 2, which shows a schematic diagram of the optical system 100 according to the embodiment of the present disclosure. As shown in FIG. 2, the optical system 100 can include a lens module 200, a reflecting module 300 and a light-sensing element 400. In addition, the optical system 100 can further include a casing (not shown in the figures), disposed in the portable electronic device 50 shown in FIG. 1, and the lens module 200, the reflecting module 300 and the light-sensing element 400 are disposed in the casing. Specifically, the lens module 200, the reflecting module 300, and the light-sensing element 400 are arranged along a first direction. For example, they are arranged along the Y-axis direction in FIG. 2. Furthermore, as shown in FIG. 2, the lens module 200 includes at least one optical lens (such as an optical lens 202), and the reflecting module 300 include a reflecting unit 302 (such as a reflecting mirror). Therefore, the reflecting unit 302 and the optical lens 202 are arranged along the first direction (for example, along the Y-axis direction) as well.

As shown in FIG. 1 and FIG. 2, an external incident light IL is emitted along a second direction (such as along the Z-axis direction) into the casing through the opening 52 of the portable electronic device 50 and then into reflecting unit 302. A third direction (such as the X-axis direction) is perpendicular to the first direction (the Y-axis direction) and the second direction (the Z-axis direction). In this embodiment, the reflecting unit 302 can have a reflecting surface 3021, which is configured to receive the incident light IL emitted along the second direction (the Z-axis direction) and to reflect a reflecting light RL. Then the reflecting light RL is projected along the first direction (the Y-axis direction) into the lens module 200. In this embodiment, the lens module 200 in FIG. 2 only shows one optical lens 202, but it is not limited to this embodiment. For example, the lens module 200 can include a plurality of optical lenses therein. When the reflecting light RL is projected into the lens module 200, the optical lens 202 of the lens module 200 is configured to guide the reflecting light RL to the light-sensing element 400, and the light-sensing element 400 generates an electronic signal after receiving the reflecting light RL. The electronic signal is transmitted to the a processor (not shown in the figures) of the portable electronic device 50, so as to generate a digital image.

In addition, it should be noted that, as shown in FIG. 2, the light-sensing element 400 has a light-sensing surface 402, and the first direction is substantially perpendicular to the light-sensing surface 402. That is, the reflecting light RL is also substantially perpendicular to the light-sensing surface 402.

Figure 3:
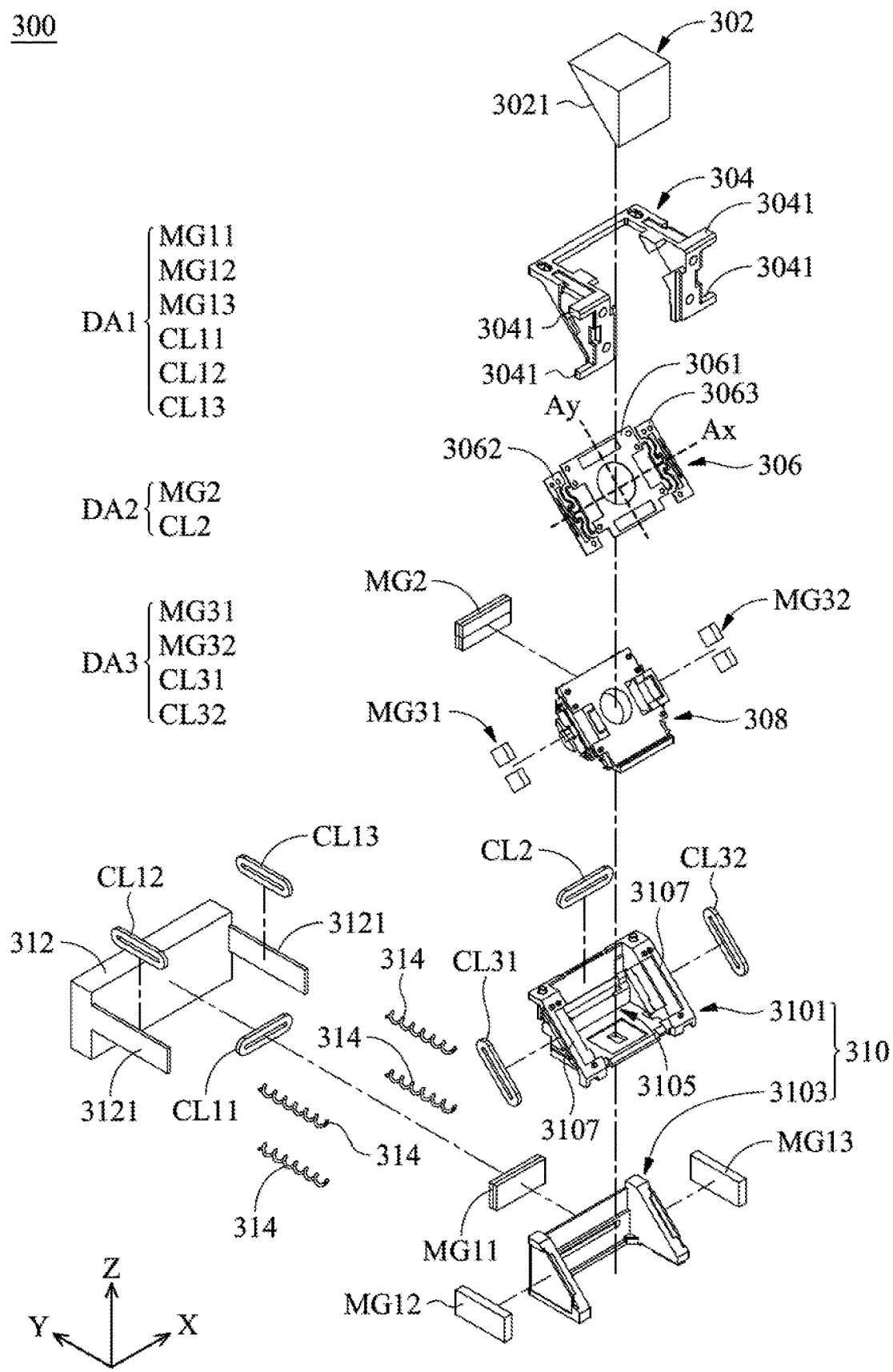
FIG. 3 shows an exploded diagram of a reflecting module according to the embodiment of the present disclosure.

Please refer to FIG. 3, which shows an exploded diagram of a reflecting module 300 according to the embodiment of the present disclosure. As shown in the figure, the reflecting module 300 includes a reflecting unit 302, an outer frame 304, a first elastic member 306, an optical element holder 308, a supporting base 310, a base 312, a plurality of second elastic members 314, a first driving assembly DA1, a second driving assembly DA2, and a third driving assembly DA3. In this embodiment, when the portable electronic device 50 is shaken, the first driving assembly DA1, the second driving assembly DA2, and the third driving assembly DA3 can be configured to drive the reflecting unit 302 to move or rotate, so that the reflecting light RL in FIG. 2 can be stably reflected to the lens module 200 and the light-sensing element 400, so as to achieve the purpose of optical image stabilization. In addition, in this embodiment, the first elastic member 306 may be a spring sheet which includes a central portion 3061, a side portion 3062 and a side portion 3063. The central portion 3061 is connected to the side portion 3062 and the side portion 3063, and the central portion 3061 can be rotated relative to the side portion 3062 and the side portion 3063.

In this embodiment, the supporting base 310 includes a first housing 3101 and a second housing 3103. The first housing 3101 is fixedly connected to the second housing 3103, such as being fixed to each other with a glue material. In addition, the third driving assembly DA3 can include two third driving coils CL31 and CL32 which are disposed between the first housing 3101 and the second housing 3103. In addition, as shown in FIG. 3, the first housing 3101 includes a central groove 3105 and two side walls 3107. The central groove 3105 is formed between the two side walls 3107, and the central groove 3105 is configured to accommodate the optical element holder 308 and the second driving assembly DA2.

Figure 4:
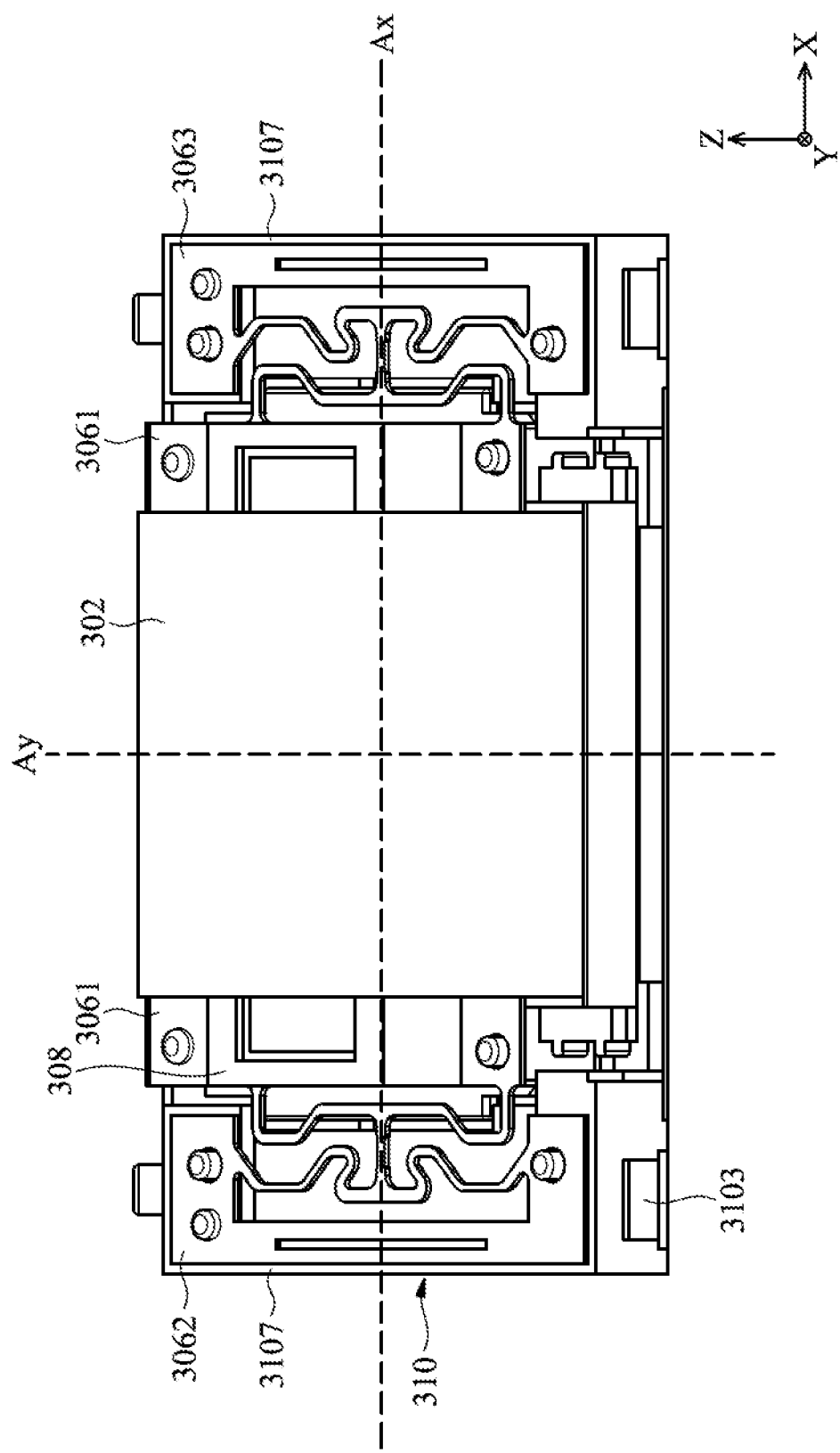
FIG. 4 shows a partial structural diagram of the reflecting module according to the embodiment of the present disclosure.

Please refer to FIG. 3 and FIG. 4. FIG. 4 shows a partial structural diagram of the reflecting module 300 according to the embodiment of the present disclosure. In this embodiment, the reflecting unit 302 is an optical reflecting mirror which is fixedly connected to the optical element holder 308 through the central portion 3061 of the first elastic member 306, and the side portion 3062 and the side portion 3063 of the first elastic member 306 are respectively fixedly connected to the two side walls 3107 of the first housing 3101. Therefore, the reflecting unit 302 and the optical element holder 308 are suspended in the central groove 3105 of the first housing 3101 by the first elastic member 306. As shown in FIG. 3, the third driving assembly DA3 further includes a pair of third magnetic elements MG31 and a pair of third magnetic elements MG32. The two pairs of third magnetic elements MG31 and MG32 are respectively fixedly disposed on opposite sides of the optical element holder 308. In addition, the second driving assembly DA2 can include a second driving coil CL2 and a second magnetic element MG2. The second driving coil CL2 is disposed on an inner surface of the central groove 3105, and the second magnetic element MG2 is disposed on a position of the optical element holder 308 corresponding to the second driving coil CL2.

Next, in this embodiment, the outer frame 304 sheaths on the first housing 3101 of the supporting base 310, and the outer frame 304 can have four protruding portions 3041 which are protruded along the X-axis direction. Thus, the base 312 can be connected to the four protruding portions 3041 of the outer frame 304 through the four second elastic members 314, as shown in FIG. 2. In addition, as shown in FIG. 3, the first driving assembly DA1 can include a first magnetic element MG11, a first magnetic element MG12, a first magnetic element MG13, a first driving coil CL11, a first driving coil CL12 and a first driving coil CL13. In this embodiment, as shown in FIG. 3, the first magnetic element MG11 is fixedly disposed on the first housing 3101 of the supporting base 310 and faces the base 312, and the first driving coil CL11 corresponding to the first magnetic element MG11 is disposed on the base 312. In addition, the first magnetic element MG12 and the first magnetic element MG13 are fixedly disposed on two sides of the second housing 3103, and the first driving coil CL12 and the first driving coil CL13 are respectively disposed on two extending portions 3121 of the base 312, facing the corresponding first magnetic element MG12 and the first magnetic element MG13.

As shown in FIG. 2 and FIG. 3, based on the above structural configuration, the first driving assembly DA1 can control the supporting base 310 to drive the reflecting unit 302 to move along a first axis direction, so as to adjust a focus position of the reflecting light RL on the light-sensing element 400. For example, the first driving assembly DA1 can control the supporting base 310 to move along the first axis direction, such as along the Y-axis direction or along the Z-axis direction. However, it should be noted that the first axis direction is not parallel to the third direction (the X-axis direction). In addition, it should be noted that positions of the magnetic elements and the driving coils of the first driving assembly DA1, the second driving assembly DA2 and the third driving assembly DA3 are not limited to this embodiment. For example, the positions of the magnetic elements and the driving coils can be interchanged. Furthermore, ways of driving the supporting base 310 to move by the first driving assembly DA1 are not limited to this embodiment. For example, the first driving assembly DA1 can also be implemented by a stepping motor or piezoelectric driving elements.

Figure 5:
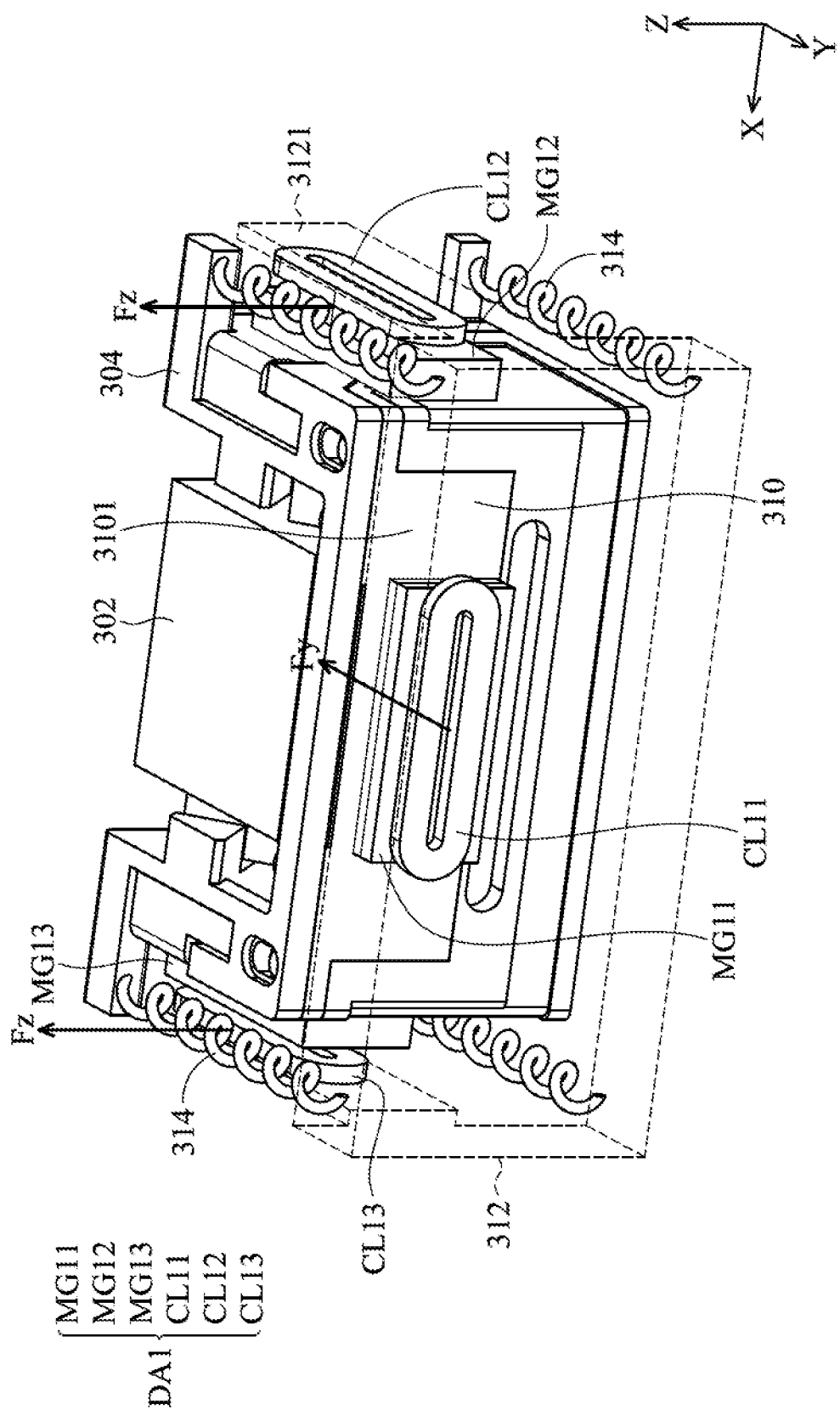
FIG. 5 shows a schematic diagram of the reflecting module in another view according to the embodiment of the present disclosure.

Please refer to FIG. 5, which shows a schematic diagram of the reflecting module 300 in another view according to the embodiment of the present disclosure. For clearly illustrating the first driving assembly DA1, the base 312 is illustrated by dotted lines. In this embodiment, the magnetic pole direction of the first magnetic element MG11 is along the Y-axis direction. For example, the direction of the N-pole of the first magnetic element MG11 goes toward the Y-axis direction, and the direction of the S-pole goes toward the −Y-axis direction. When the first driving coil CL11 is provided with electricity, an electromagnetic driving force Fy is generated by the first driving coil CL11 and the first magnetic element MG11 according to Lenz's law, so as to drive the reflecting unit 302 with the outer frame 304 to move along the Y-axis direction relative to the base 312. Moreover, in this embodiment, the second elastic members 314 include a spiral structure, and when the outer frame 304 is moved along the Y-axis direction relative to the base 312, the second elastic members 314 may be stretched or compressed.

In this embodiment, the magnetic pole directions of the first magnetic element MG12 and the first magnetic element MG13 are along the Z-axis direction. When the first driving coil CL12 and the first driving coil CL13 are provided with electricity, the first driving coil CL12 and the first driving coil CL13 respectively act with the first magnetic element MG12 and the first magnetic element MG13 to generate two electromagnetic driving forces Fz, so as to drive the supporting base 310 with the reflecting unit 302 to move along the Z-axis direction relative to the base 312. Therefore, based on the configuration of the first driving assembly DA1, the reflecting unit 302 can be driven to move relative to the base 312 along the Y-axis direction or the Z-axis direction.

Figure 6:
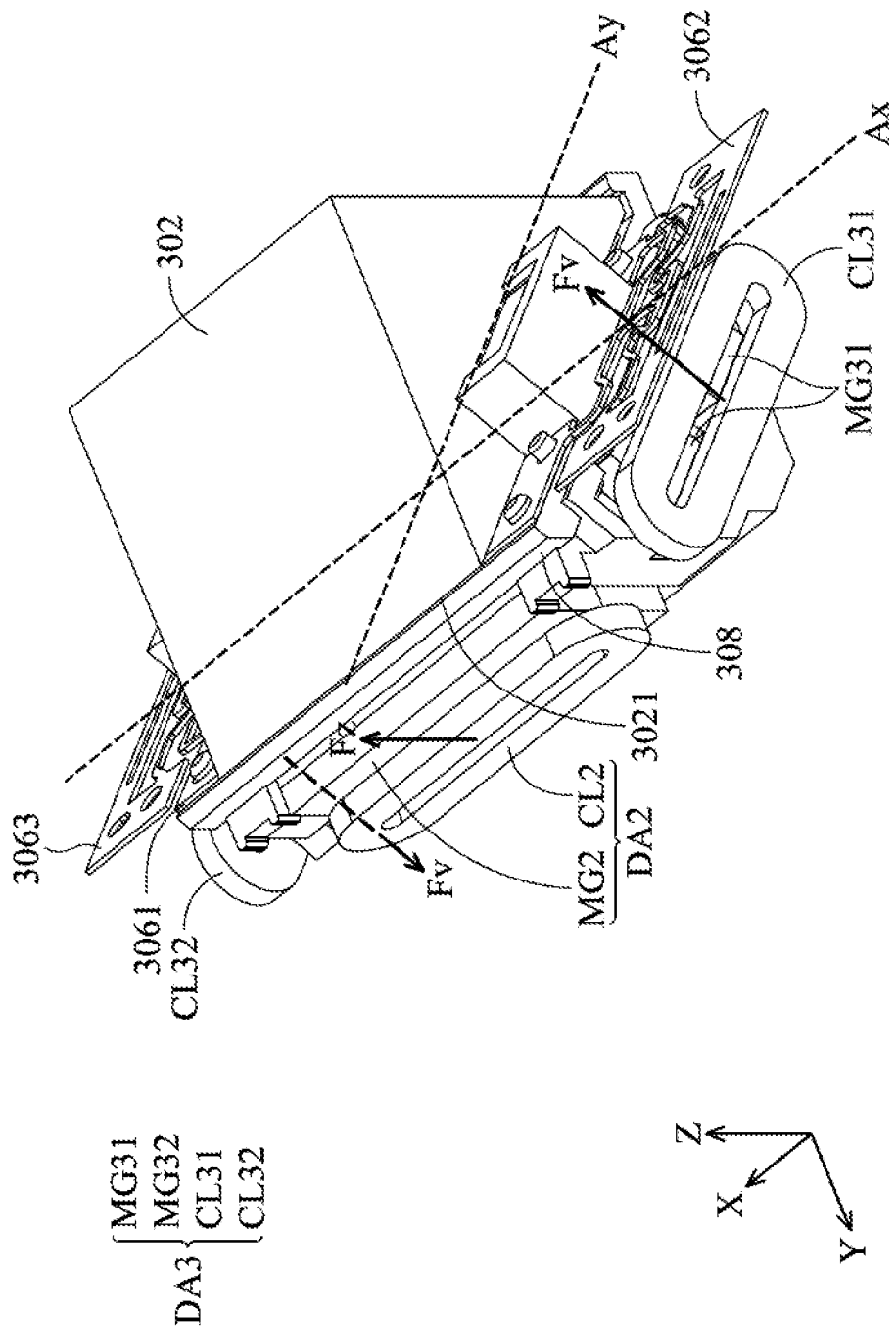
FIG. 6 shows a partial structural diagram of the reflecting module in another view according to the embodiment of the present disclosure.

Please refer to FIG. 4 and FIG. 6. FIG. 6 shows a partial structural diagram of the reflecting module 300 in another view according to the embodiment of the present disclosure. As shown in FIG. 6, when the second driving coil CL2 of the second driving assembly DA2 is provided with electricity, the second driving coil CL2 acts with the second magnetic element MG2 to generate an electromagnetic driving force Fz along the Z-axis direction, so as to drive the optical element holder 308, the reflecting unit 302, and the central portion 3061 of the first elastic member 306 to rotate around a second axis Ax relative to the side portion 3062 and the side portion 3063. That is, the electromagnetic driving force Fz can drive the reflecting unit 302 to rotate around the second axis Ax relative to the supporting base 310 (FIG. 4).

Similarly, as shown in FIG. 6, when the third driving coils CL31 and CL32 of the third driving assembly DA3 are provided with electricity (the currents received by the third driving coils CL31 and CL32 have the same magnitude but opposite phases), the third driving coils CL31 and CL32 respectively act with the third magnetic elements MG31 and MG32 to generate two electromagnetic driving forces Fv in opposite directions, so as to drive the optical element bolder 308, the reflecting unit 302 and the central portion 3061 of the first elastic member 306 to rotate around a third axis Ay relative to the side portion 3062 and the side portion 3063. That is, the electromagnetic driving forces Fv can drive the reflecting unit 302 to rotate around the third axis Ay relative to the holding base 310 (FIG. 4). It should be noted that the direction of the electromagnetic driving force Fv is substantially perpendicular to the reflecting surface 3021 of the reflecting unit 302, that is, the direction of the electromagnetic driving force Fv is parallel to the normal vector of the reflecting surface 3021. In addition, directions of the second axis Ax and the third axis Ay are not parallel to the direction of the electromagnetic driving force Fv. For example, directions of the second axis Ax and the third axis Ay are substantially perpendicular to the direction of the electromagnetic driving force Fv.

Figure 7A:
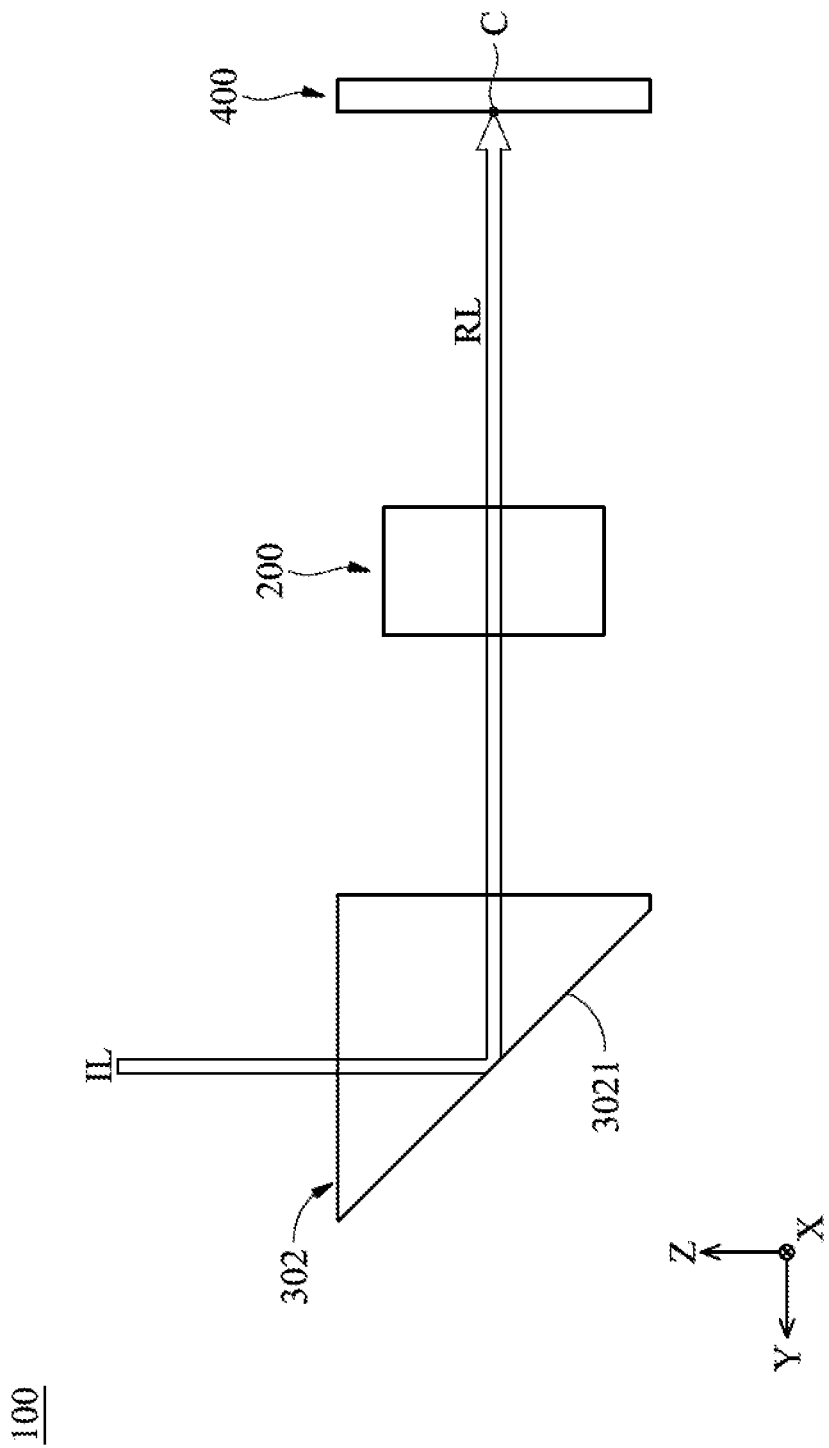
FIG. 7A to FIG. 7C show diagrams illustrating that the optical system is in different states according to the embodiment of the present disclosure.
Figure 7B:
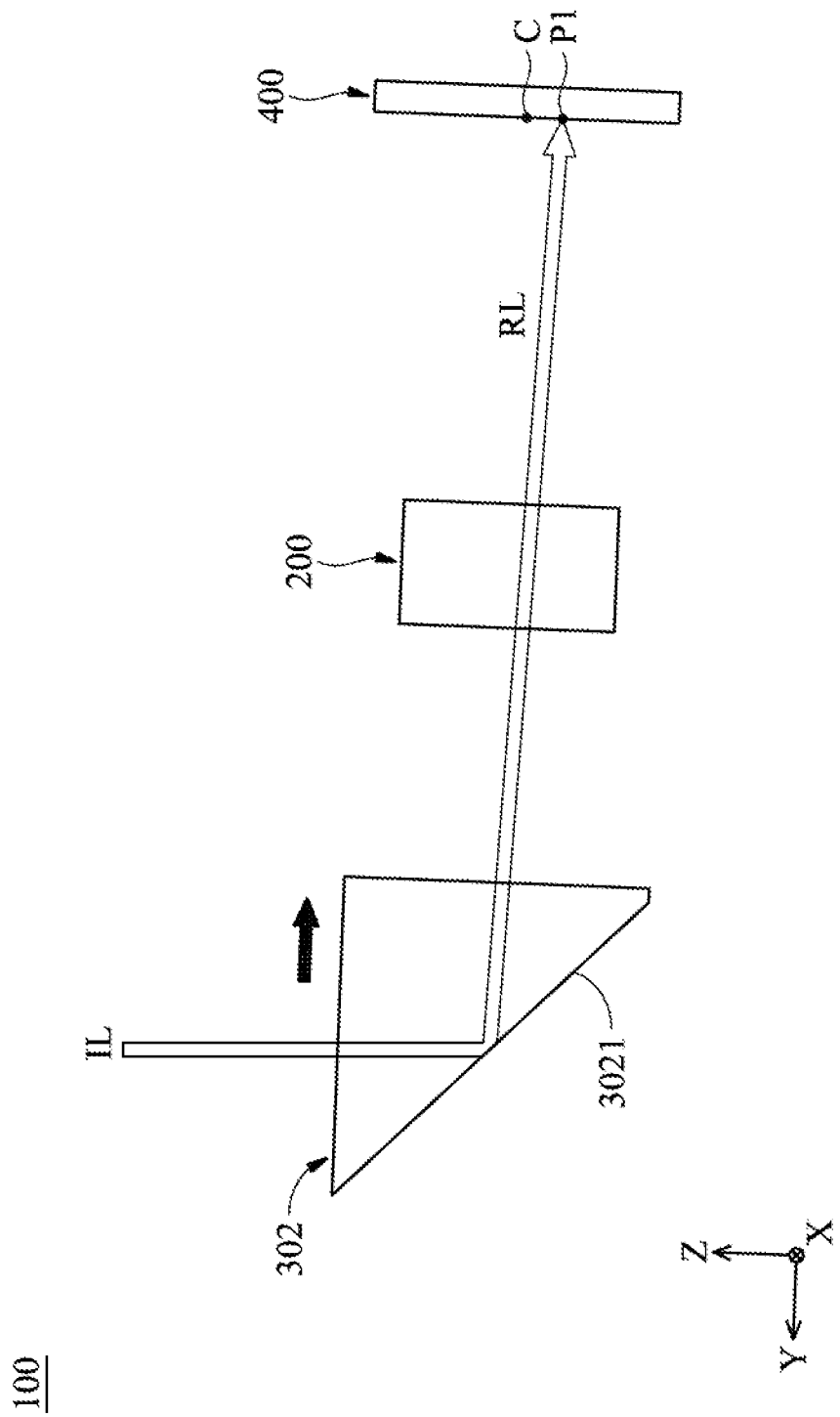
Figure 7C:
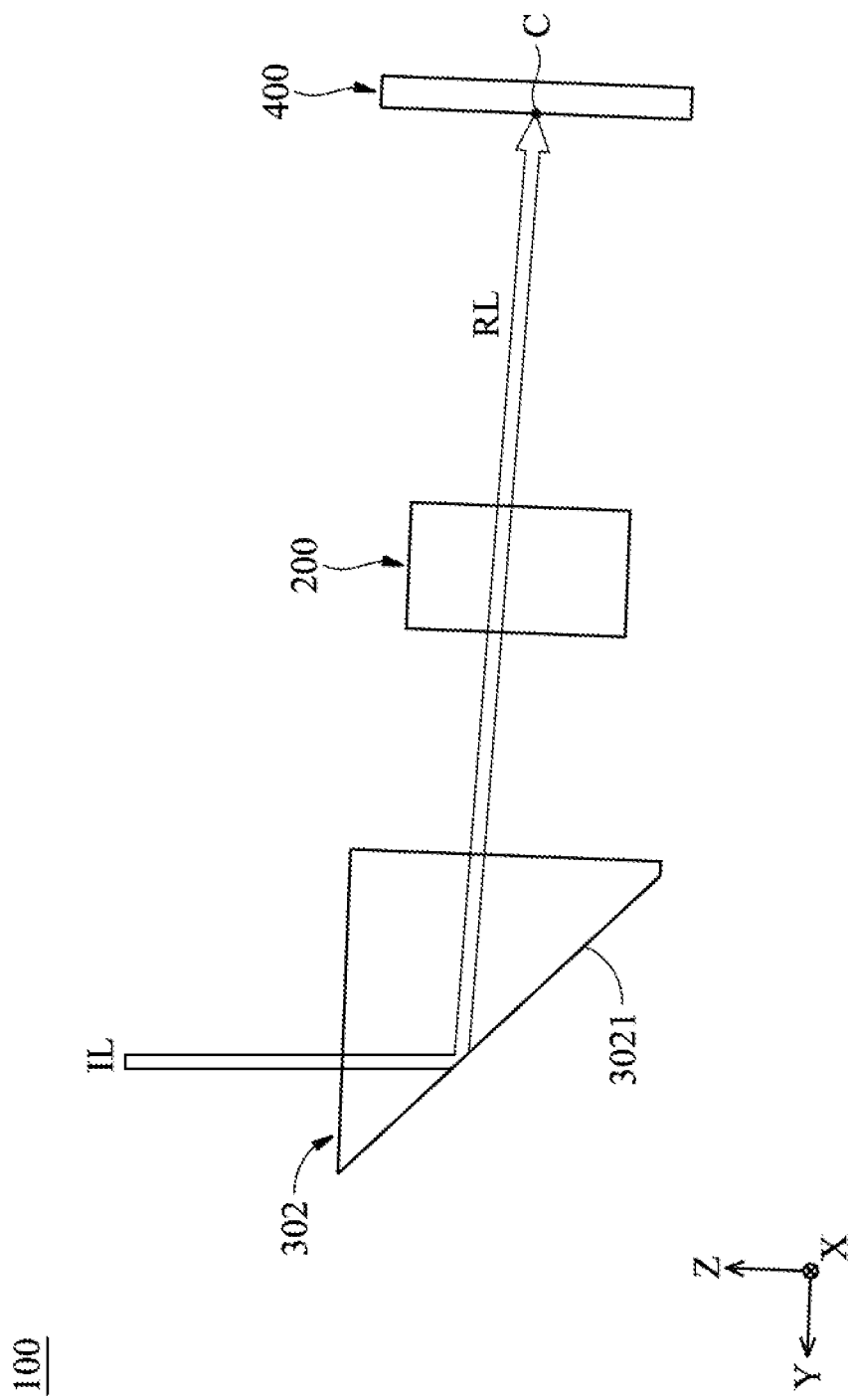

Please refer to FIG. 7A to FIG. 7C. FIG. 7A to FIG. 7C show diagrams illustrating that the optical system 100 is in different states according to the embodiment of the present disclosure. In FIG. 7A, the optical system 100 is parallel to a reference plane (such as being parallel to the horizontal plane), and the reflecting light RL is reflected to a central position C (a focus position) of the light-sensing element 400. FIG. 7B is a diagram of the optical system 100 rotated clockwise at an angle relative to the horizontal plane. As shown in FIG. 7B, because the optical system 100 is rotated at an angle (such as being rotated 5 degrees) relative to the horizontal plane, the position of the reflecting light RL on the light-sensing element 400 may deviate. As shown in FIG. 7B, the reflecting light RL is reflected to a first position P1 on the light-sensing element 400.

In order to compensate for the deviated distance of the reflecting light RL on the light-sensing element 400 (that is, the distance between the central position C and the first position P1), the first driving assembly DA1 (FIG. 5) can drive the reflecting unit 302 to move along the direction (the −Y-axis direction) indicated by the arrow shown in FIG. 7B. Thus, the reflecting unit 302 can be moved from the position in FIG. 7B to the position in FIG. 7C. Therefore, as shown in FIG. 7C, the position of the reflecting light RL on the light-sensing element 400 returns from the first position P1 to the central position C, so as to achieve the purpose of optical image stabilization.

It should be noted that, in this embodiment, the reflecting surface 3021 of the reflecting unit 302 is a flat surface, and it only needs to move the reflecting unit 302 along the −Y-axis direction without rotating the reflecting unit 302 to achieve the purpose of compensation. In addition, based on the structural configuration of this embodiment, the reflecting light RL which is reflected onto the light-sensing element 400 can still have good quality, so that the light-sensing element 400 can generate a clear image.

In this embodiment, when the optical system 100 is rotated clockwise relative to the horizontal plane, the first driving assembly DA1 can drive the reflecting unit 302 to move along the −Y-axis direction, and therefore the deviated distance of the reflecting light RL on the light-sensing element 400 can be compensated for. Similarly, when the optical system 100 is rotated counterclockwise relative to the horizontal plane, the first driving assembly DA1 can drive the reflecting unit 302 to move along the Y-axis direction, and therefore the deviated distance of the reflecting light RL on the light-sensing element 400 can be compensated for. In this embodiment, the distance of the reflecting unit 302 compensated by the first driving assembly DA1 may correspond to an angle between the optical system 100 and the horizontal plane. For example, when the optical system 100 is rotated clockwise 1 degree relative to the horizontal plane, the first driving assembly DA1 drives the reflecting unit 302 to move with 125 μm along the −Y-axis direction, so as to achieve the purpose of compensating for the deviated distance.

Figure 8:
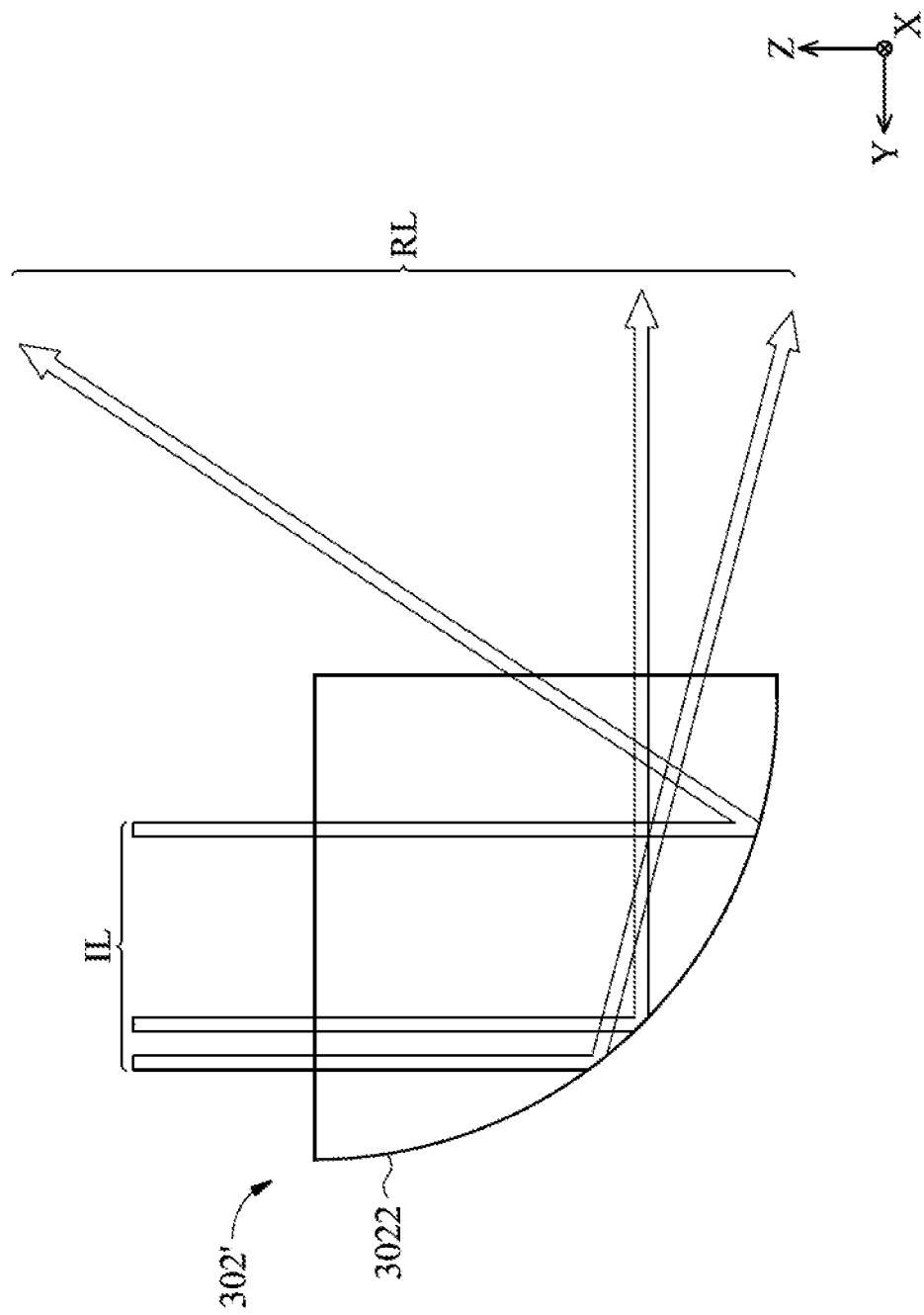
FIG. 8 shows a schematic side view of a reflecting unit according to another embodiment of the present disclosure.

Please refer to FIG. 8, which shows a schematic side view of a reflecting unit 302' according to another embodiment of the present disclosure. In this embodiment, the reflecting unit 302' includes a reflecting surface 3022, and the reflecting surface 3022 includes an arc structure. As shown in FIG. 8, in contrast to the reflecting unit 302 of the previous embodiment, the structure of the reflecting surface 3022 in this embodiment can increase the angle between the reflecting light RL and the incident light IL. For example, when two parallel light beams are emitted onto the reflecting surface 3022, two reflected light beams with different reflecting angles are generated. As a result, the effect of compensation can be further improved.

Figure 9A:
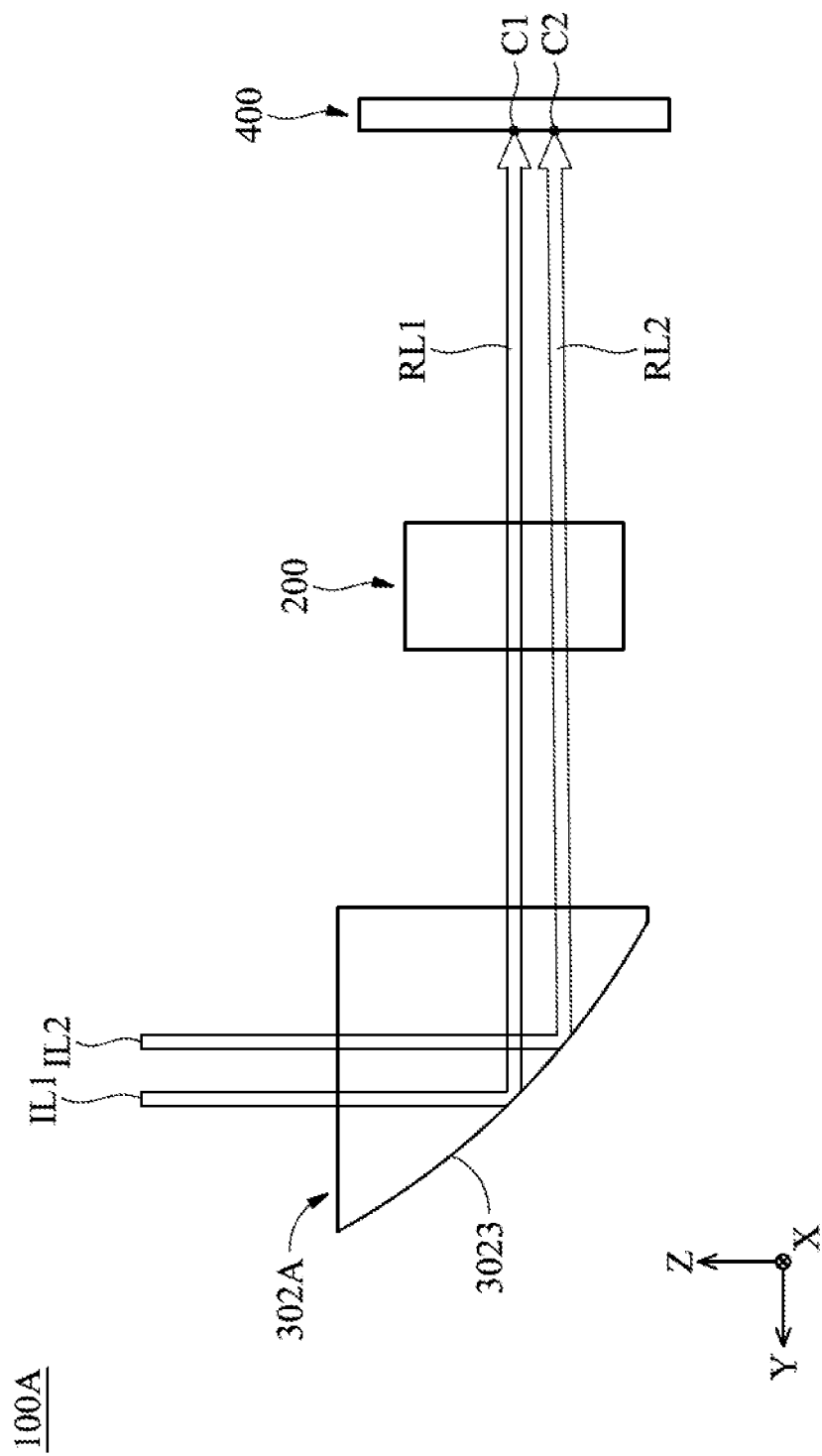
FIG. 9A to FIG. 9C show diagrams of an optical system in different states according to another embodiment of the present disclosure.
Figure 9B:
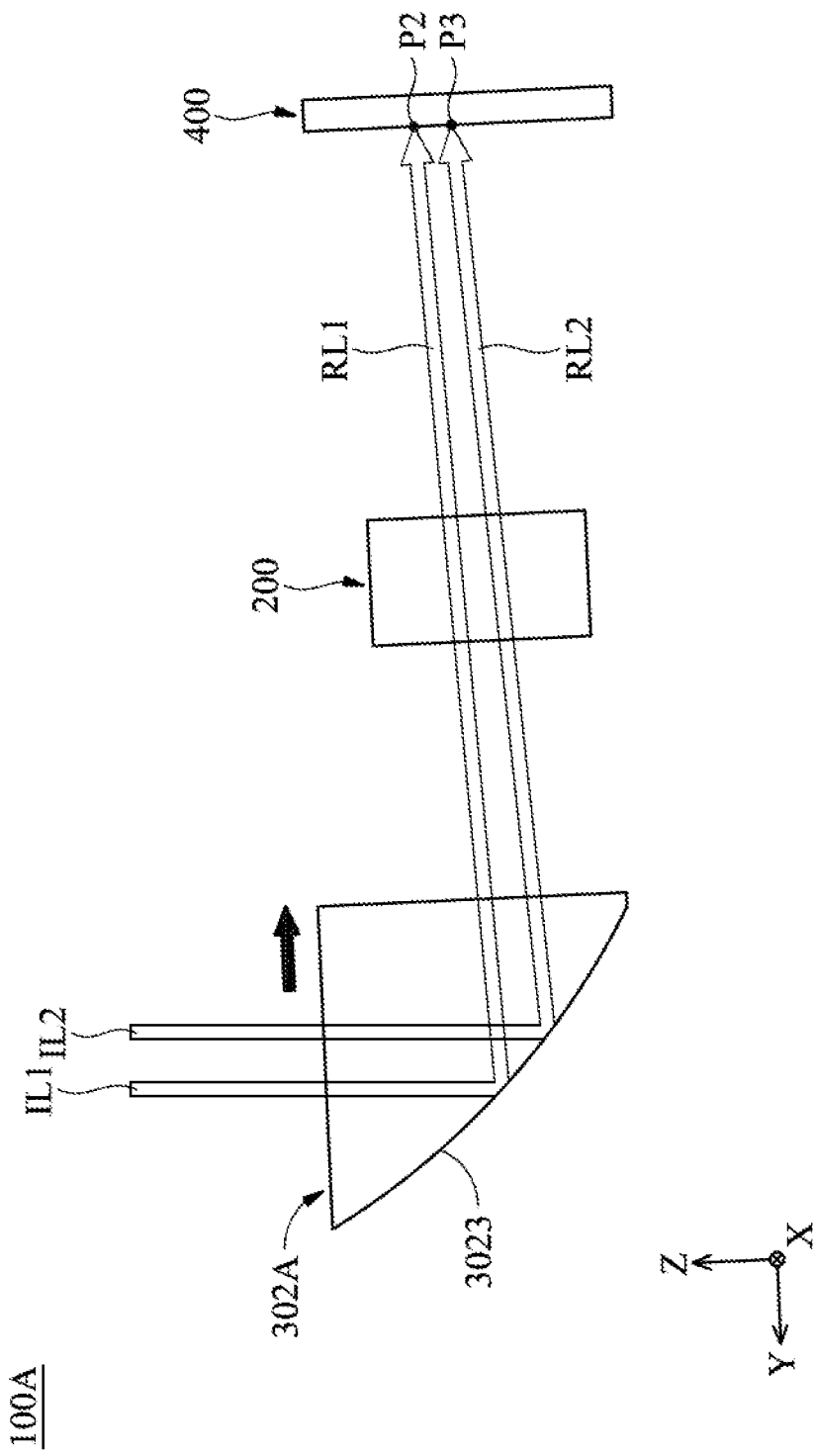
Figure 9C:
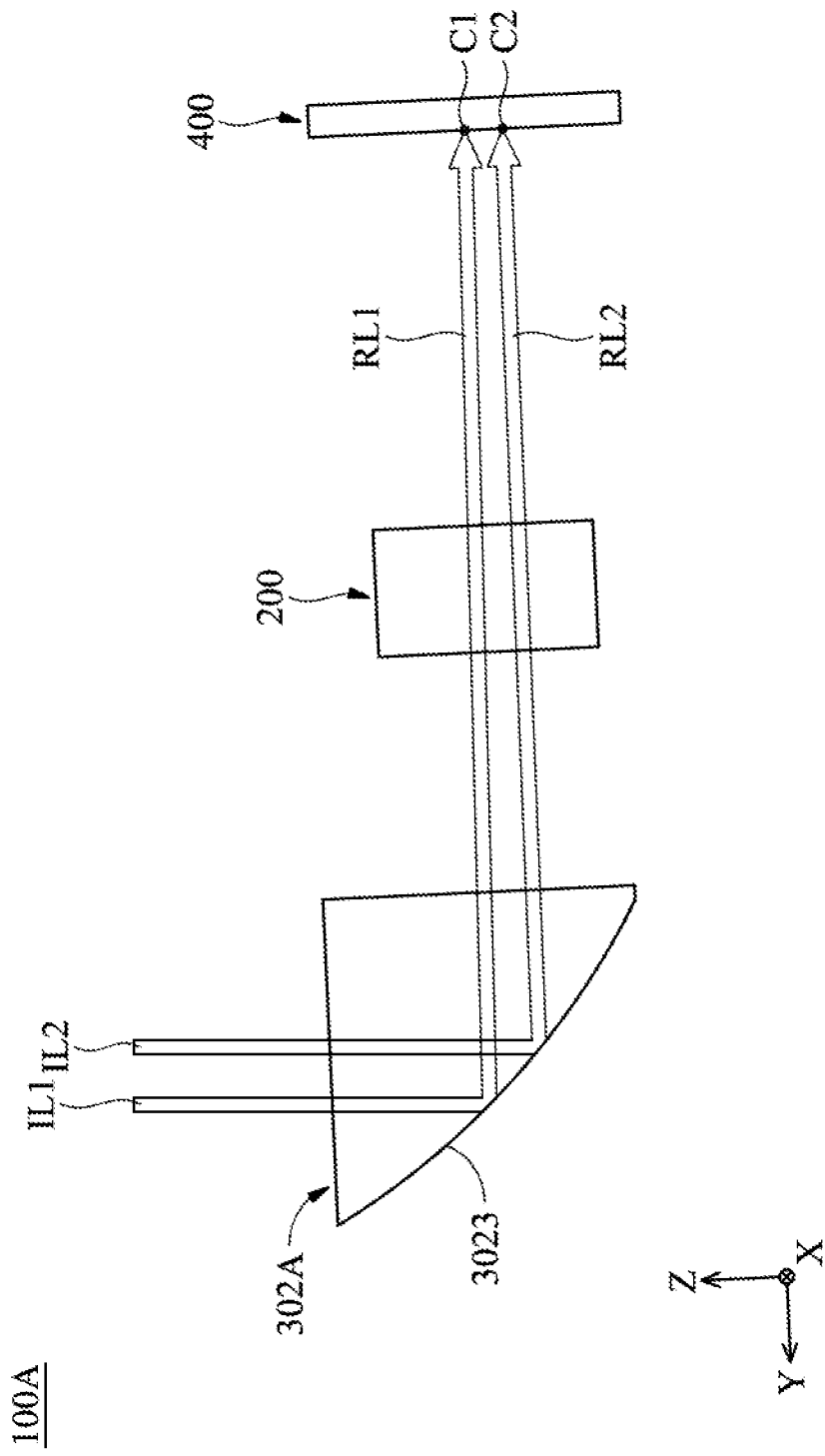

Please refer to FIG. 9A to FIG. 9C, which show diagrams of an optical system 100A in different states according to another embodiment of the present disclosure. In this embodiment, the optical system 100A includes a reflecting unit 302A. A reflecting surface 3023 of the reflecting unit 302A includes an arc structure, and the center of the arc structure corresponds to the center of an incident light IL1. In addition, in this embodiment, the arc structure of the reflecting surface 3023 is a convex structure and is curved away from the lens module 200, but it is not limited thereto. For example, in other embodiments, the arc structure of the reflecting surface 3023 can also be a concave structure and is curved toward the lens module 200. Furthermore, in this embodiment, the arc structure can have a radius, and the radius ranges from about 100 to 1000 mm.

In FIG. 9A the optical system 100A is not shaken and is parallel to the horizontal plane, and an incident light IL1 and an incident light IL2 are emitted to the reflecting unit 302A along the Z-axis direction. Next, a reflecting light RL1 and a reflecting light RL2 are respectively reflected to a central position C1 and a side position C2 on the light-sensing element 400. FIG. 9B is a diagram of the optical system 100A after rotating counterclockwise at an angle relative to the horizontal plane according to the embodiment of the present disclosure. As shown in FIG. 9B, because the optical system 100A is rotated at an angle (such as being rotated 5 degrees) relative to the horizontal plane, the positions of the reflecting light RL1 and the reflecting light RL2 reflected on the light-sensing element 400 may deviate. As shown in FIG. 9B, the reflecting light RL1 and the reflecting light RL2 are respectively reflected to a second position P2 and a third position P3 on the light-sensing element 400.

In order to compensate for the deviated distances of the reflecting light RL1 and the reflecting light RL2 on the light-sensing element 400, the first driving assembly DA1 (FIG. 5) can drive the reflecting unit 302A to move along the direction (the −Y-axis direction) indicated by the arrow shown in FIG. 9B. Thus, the reflecting unit 302A can be moved from the position in the FIG. 9B to the position in FIG. 9C. Therefore, as shown in FIG. 9C, the position of the reflecting light RL1 on the light-sensing element 400 returns from the second position P2 to the central position C1, and the position of the reflecting light RL2 on the light-sensing element 400 returns from the third position P3 to the side position C2, so as to achieve the purpose of optical image stabilization.

Similarly, in this embodiment, when the optical system 100A is rotated clockwise relative to the horizontal plane, the first driving assembly DA1 can drive the reflecting unit 302A to move along the Y-axis direction, and the deviated distances of the reflecting light RL1 and the reflecting light RL2 on the light-sensing element 400 can be compensated for.

Figure 10:
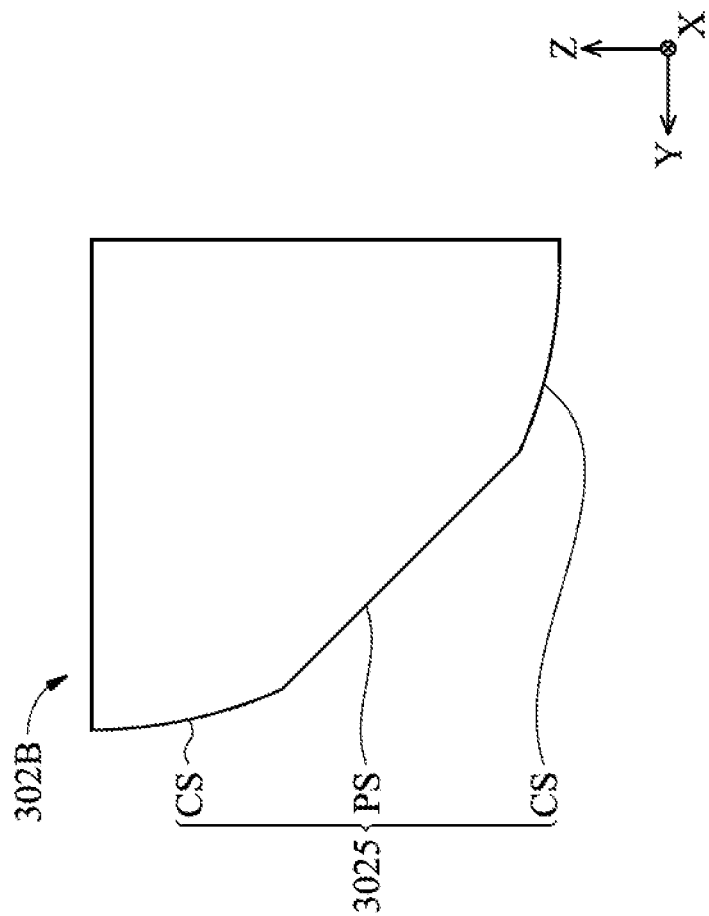
FIG. 10 shows a schematic side view of a reflecting unit according to another embodiment of the present disclosure.

Please refer to FIG. 10, which shows a schematic side view of a reflecting unit 302B according to another embodiment of the present disclosure. As shown in FIG. 10, a reflecting surface 3025 of the reflecting unit 302B includes a flat surface PS and an arc structure CS, and the arc structure CS surrounds the flat surface PS. In this embodiment, the arc structure CS has a radius, and the radius ranges from about 100 to 1000 mm. The reflecting unit 302B in this embodiment is similar to the reflecting unit 302A.

In the embodiments of FIG. 9A and FIG. 10, based on the design of the reflecting surface having an arc structure, the focus position of the light which is reflected by the periphery of the reflecting surface onto the light-sensing element 400 can be more accurate. For example, the compensation effect of the reflecting light RL2 in FIG. 9C can be more accurate.

In addition, in the other embodiments of the present disclosure, in order to further improve the compensation result, the plurality of driving assemblies may further control the reflecting unit to move and rotate together. For example, in some embodiments, the first driving assembly DA1 and the second driving assembly DA2 can control the reflecting unit to move along the Y-axis direction and rotate around the second axis Ax together, so as to achieve the purpose of two-axis compensation. In some embodiments, the first driving assembly DA1 can control the reflecting unit to move along the Y-axis direction and the Z-axis direction together, so as to achieve the purpose of two-axis compensation.

In addition, in some embodiments, the first driving assembly DA1 and the second driving assembly DA2 can control the reflecting unit to move along the Y-axis direction, move along the Z-axis direction, and rotate around the second axis Ax together, so as to achieve the purpose of three-axis compensation. In addition, in some embodiments, the first driving assembly DA1, the second driving assembly DA2, and the third driving assembly DA3 can control the reflecting unit to move along the Y-axis direction, move along the Z-axis direction, rotate around the second axis Ax and rotate around the third axis Ay, so as to achieve the purpose of four-axis compensation.

In conclusion, the present disclosure provides an optical system with a long focal length that is installed in an electronic device for capturing images. The optical system can have a lens module 200, a reflecting module 300, a light-sensing element 400, and a plurality of driving assemblies. The reflecting module 300 includes a reflecting unit. The reflecting unit can reflect an external light to the lens module 200 and then to the light-sensing element 400, so as to generate a digital image. It should be noted that when the optical system is shaken, the plurality of driving assemblies can control the reflecting unit to move along a first axis direction, rotate around a second axis and/or rotate around a third axis, to adjust the focus position of the reflecting light on the light-sensing element 400, so as to achieve the purpose of optical image stabilization. Therefore, the image quality of the light-sensing element 400 can also be improved.

In some embodiments, the reflecting surface of the reflecting unit is a flat surface, and the driving assemblies can only control the reflecting unit to move along the first axis direction, so as to achieve the purpose of compensating for the focus position. In addition, in some embodiments, the reflecting surface of the reflecting unit can further include an arc structure. Based on the design of the arc structure, the focus position of the light which is reflected by the periphery of the reflecting surface onto the light-sensing element 400 can be more accurate.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
a light-sensing element;
at least one optical lens;
a reflecting unit, comprising a reflecting surface, wherein the reflecting surface is configured to receive an incident light and to reflect a reflecting light, and the reflecting light is projected into the light-sensing element through the optical lens; and
a first driving assembly, configured to control the reflecting unit to move along a first axis direction from a first position to a second position, so as to adjust a focus position of the reflecting light on the light-sensing element;
wherein the reflecting surface in the first position is parallel to the reflecting surface in the second position, and a distance between a center of the reflecting unit in the first position and the center of the reflecting unit in the second position is not zero.

2. The optical system as claimed in claim 1, wherein the reflecting unit and the optical lens are arranged along a first direction, the incident light is emitted to the reflecting unit along a second direction, and a third direction is perpendicular to the first direction and the second direction, wherein the first axis direction is not parallel to the third direction.

3. The optical system as claimed in claim 2, wherein the first direction is substantially perpendicular to a light-sensing surface of the light-sensing element.

4. The optical system as claimed in claim 1, wherein the reflecting surface includes an arc structure.

5. The optical system as claimed in claim 4, wherein a center of the arc structure corresponds to a center of the incident light.

6. The optical system as claimed in claim 4, wherein the reflecting surface includes a radius, and the radius substantially ranges from 100 to 1000 mm.

7. The optical system as claimed in claim 4, wherein the reflecting surface further includes a flat surface, and the arc structure surrounds the flat surface.

8. The optical system as claimed in claim 4, wherein the arc structure is a convex structure or a concave structure.

9. The optical system as claimed in claim 1, wherein the optical system further comprises a second driving assembly, configured to drive the reflecting unit to rotate around a second axis.

10. The optical system as claimed in claim 1, wherein the optical system further comprises a third driving assembly, configured to drive the reflecting unit to rotate around a third axis.

* * * * *